US010514725B2

(12) United States Patent
Anderson (10) Patent No.: US 10,514,725 B2
(45) Date of Patent: Dec. 24, 2019

(54) CONTENT RECONFIGURATION BASED ON CHARACTERISTIC ANALYSIS (71) Applicant: INTEL CORPORATION, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/128,072

(22) PCT Filed: Sep. 12, 2013

(86) PCT No.: PCT/US2013/059468
§ 371 (c)(1),
(2) Date: Dec. 20, 2013

(87) PCT Pub. No.: WO2015/038130
PCT Pub. Date: Mar. 19, 2015

(65) Prior Publication Data
US 2015/0074545 A1 Mar. 12, 2015

(51) Int. Cl.
*G06F 1/16* (2006.01)
*G06K 9/00* (2006.01)
(Continued)

(52) U.S. Cl.
CPC ............ *G06F 1/163* (2013.01); *G06F 1/1652* (2013.01); *G06F 3/0482* (2013.01);
(Continued)

(58) Field of Classification Search
None
See application file for complete search history.

(56) References Cited

U.S. PATENT DOCUMENTS 8,892,987 B2 * 11/2014 Leebow .................. G06F 3/048
715/202
9,554,111 B2 * 1/2017 Rav-Acha .............. G11B 27/28
(Continued)

FOREIGN PATENT DOCUMENTS

CN 102253836 A 11/2011
JP 2006261711 A * 9/2006
(Continued)

OTHER PUBLICATIONS

EPO and Google, "English Translation of JP200626171-Desc".*
(Continued)

*Primary Examiner* — Beau D Spratt
(74) *Attorney, Agent, or Firm* — Grossman, Tucker, Perreault & Pfleger, PLLC (57) ABSTRACT This disclosure is directed to content reconfiguration based on characteristic analysis. A device may comprise a display and a user interface module to cause content to be presented on the display. When content is to be presented, content and display characteristics may first be determined. The content may then be altered based on the characteristics of the display. For example, the content may be divided into portions and at least one portion of the content may be determined for presentation based on subject matter in the content selected in view of at least one of user preferences, contextual information determined by at least one sensor in the device, etc. The user interface module may then alter the at least one portion of content for presentation, if necessary, and may further cause the at least one portion of content to be presented on the display.

18 Claims, 4 Drawing Sheets (51) Int. Cl.
   *G06F 3/0482*  (2013.01)
   *G06F 3/0484*  (2013.01)
   *G06F 3/0485*  (2013.01)
   *H04M 1/725*  (2006.01)
   *G06F 3/0488*  (2013.01)

(52) U.S. Cl.
   CPC ........ *G06F 3/0485* (2013.01); *G06F 3/04845* (2013.01); *G06F 3/04883* (2013.01); *G06K 9/00671* (2013.01); *H04M 1/72569* (2013.01)

(56) References Cited

U.S. PATENT DOCUMENTS

| | | |
|---|---|---|
| 2005/0193326 A1 | 9/2005 | Dettinger et al. |
| 2006/0274960 A1* | 12/2006 | Tamaru ............... G06F 17/3028 382/274 |
| 2007/0214409 A1 | 9/2007 | Miyata |
| 2008/0320413 A1 | 12/2008 | Oshiro et al. |
| 2009/0089713 A1* | 4/2009 | Tabe .................... G06F 3/0482 715/838 |
| 2010/0026842 A1* | 2/2010 | Ishizaka ............ G06F 17/30265 348/231.2 |
| 2010/0042235 A1 | 2/2010 | Basso et al. |
| 2010/0302347 A1* | 12/2010 | Shikata .................. H04N 5/232 348/36 |
| 2011/0025706 A1 | 2/2011 | Etelapera |
| 2011/0138422 A1 | 6/2011 | Shintani et al. |
| 2011/0191686 A1* | 8/2011 | Wolff-Petersen et al. .... 715/735 |
| 2011/0302497 A1* | 12/2011 | Garrett et al. ................ 715/736 |
| 2012/0017172 A1* | 1/2012 | Sheth et al. .................. 715/800 |
| 2012/0019722 A1 | 1/2012 | Kwisthout et al. |
| 2012/0023442 A1 | 1/2012 | Oshiro et al. |
| 2012/0147033 A1* | 6/2012 | Singhal ................... G06F 3/147 345/629 |
| 2012/0194420 A1* | 8/2012 | Osterhout .......... G02B 27/0093 345/156 |
| 2012/0306910 A1* | 12/2012 | Kim ....................... H04N 13/04 345/619 |
| 2013/0036438 A1* | 2/2013 | Kutaragi ............ H04N 21/2743 725/38 |
| 2015/0116355 A1* | 4/2015 | Hofmann ........... G06K 9/00671 345/633 |
| 2015/0205447 A1* | 7/2015 | Jia et al. ....................... 715/790 |

FOREIGN PATENT DOCUMENTS

| | | |
|---|---|---|
| KR | 20080109906 A | 12/2008 |
| WO | 2001-075654 A2 | 10/2001 |
| WO | 2001-075654 A3 | 10/2001 |
| WO | 2011000893 A1 | 1/2011 |

OTHER PUBLICATIONS

International Search Report and Written Opinion received for PCT Application No. PCT/US2013/059468, dated Jun. 13, 2014, 11 pages.

International Preliminary Report on Patentability received for PCT Application No. PCT/US2013/059468, dated Mar. 24, 2016, 12 pages.

European Extended Search Report issued in European Application No. 13893309.8, dated May 18, 2017, 8 pages.

European Supplementary Search Report issued in European Application No. 13893309.8, dated Jun. 7, 2017, 1 page.

Chinese Office Action issued in Chinese Application No. 201380078798. 5, dated Feb. 24, 2018, with English machine translation, 19 pages.

Chinese Office Action issued in Chinese Application No. 201380078798. 5, dated Oct. 24, 2018, 8 pages.

Chinese Office Action in Chinese Patent Application No. 201380078798 received on Mar. 14, 2019, 11 pages.

European Office Action received in European Patent Application No. 13893309.8 dated Mar. 15, 2019, 8 pages.

Decision on Rejection issued in Chinese Application No. 201380078798. 5, dated Aug. 7, 2019, 16 pages.

* cited by examiner

CONTENT RECONFIGURATION BASED ON CHARACTERISTIC ANALYSIS

TECHNICAL FIELD

The present disclosure relates to the presentation of content on a device display, and more particularly, to a system for presenting content based on an analysis of characteristics.

BACKGROUND

Emerging advances in display technology are now starting to yield displays that are not only better performing, but also more flexible in terms of implementation. For example, advances in materials (e.g., flexible substrates) and assembly methods are allowing different geometries of displays to become available. Non-planar displays (e.g., including at least one curved surface) are now able to be manufactured. Displays including curved surfaces may be employed in a variety of devices. For example, standalone monitors may "wrap-around" a user of a computing device to create a more immersive experience when consuming content such as watching televisions shows or movies, playing games, etc. Curved displays may also allow larger displays to be incorporated into devices that do not include enough real estate to utilize a planar screen. For example, recently there has been increased interest in wearable computing devices. Computing devices may be worn on the wrist of a user, incorporated into eyewear, etc. To maintain a stylish appeal, the size of such devices may be limited, and thus, using displays including curved surfaces may be beneficial both functionally and stylistically.

While using displays including curved surfaces may be beneficial from the standpoint of style and the ability to incorporate larger screens into smaller devices, the implementation of such displays may be problematic from a use standpoint. Content created for a flat screen comprising an industry standard aspect ratio may not translate clearly to emerging platforms. For example, worn items such as wristwatch-format computing/communication devices may comprise displays that may be substantially smaller than other similar presentation devices with non-standard aspect ratio (e.g., elongated, narrow, etc.) and curved surfaces. Existing presentation schemes may dictate that content be resized to fit fully within the confines of a display. However, in the instance of the example worn device the content may be presented in a manner that is much too small to view clearly. Alternatively, presenting content at full size may also be unacceptable to users due to the distorted appearance of large scale content within such a small display area, inadequate interfaces for manipulating the presentation, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to content reconfiguration based on characteristic analysis. A device may comprise a display and a user interface module to cause content to be presented on the display. When content is to be presented, content and display characteristics may first be determined. The content may then be altered based on the characteristics of the display. For example, the content may be divided into portions, and at least one portion of the content may be determined for presentation on the display. Determination of the at least one portion of the content may be based on, for example, subject matter in the content selected in view of at least one of user preferences (e.g., user settings, previous user actions, etc.), contextual information determined by at least one sensor in the device, etc. The user interface module may then alter the at least one portion of content for presentation on the display, if necessary, and may further cause the at least one portion of content to be presented on the display.

In one embodiment there is provided a device comprising, for example, a display and a user interface module. The display may be to present at least content. The user interface module may be to determine characteristics for the content and to determine characteristics for the display. Following the determination of content and device characteristics, the user interface module may further be to reconfigure the content for presentation on the display based at least on the content characteristics and the display characteristics and to cause the reconfigured content to be presented on the display.

Example content characteristics may comprise at least one of content size, shape, orientation, resolution, color composition and subject matter. Example display characteristics may comprise at least one of display size, resolution, refresh rate and surface shape. In one embodiment, the user interface module being to reconfigure the content may comprise the user interface module being to determine at least one portion of the content for presentation on the display based on the subject matter determined for the content. Reconfiguring the content may also comprise the user interface module being to alter at least one of size, shape, orientation, resolution or color composition of the at least one portion of content. The user interface module being to cause the reconfigured content to be presented may comprise the user interface module being to cause the at least one portion of content to be presented on the display.

In one example implementation, the user interface module may be further to cause the device to determine contextual information. Example contextual information may comprise at least one of wherein contextual information comprises at least one of user identification, user activity, device location, device orientation, time, environmental conditions or identification of other proximate devices. Reconfiguring the content for presentation may then also comprise the user interface module being to select the subject matter for determining the at least one portion of content based on the contextual information. In one embodiment, the user interface module may further be to determine user preferences for use in reconfiguring the content for presentation on the display. Example user preferences may be based on previous user actions. A method consistent with embodiments of the present disclosure may comprise, for example, triggering a requirement to present content on a display in a device, determining characteristics for the content, determining characteristics for the display, reconfiguring the content for presentation on the display based at least on the content characteristics and the display characteristics and causing the content to be presented on the display.

Figure 1:
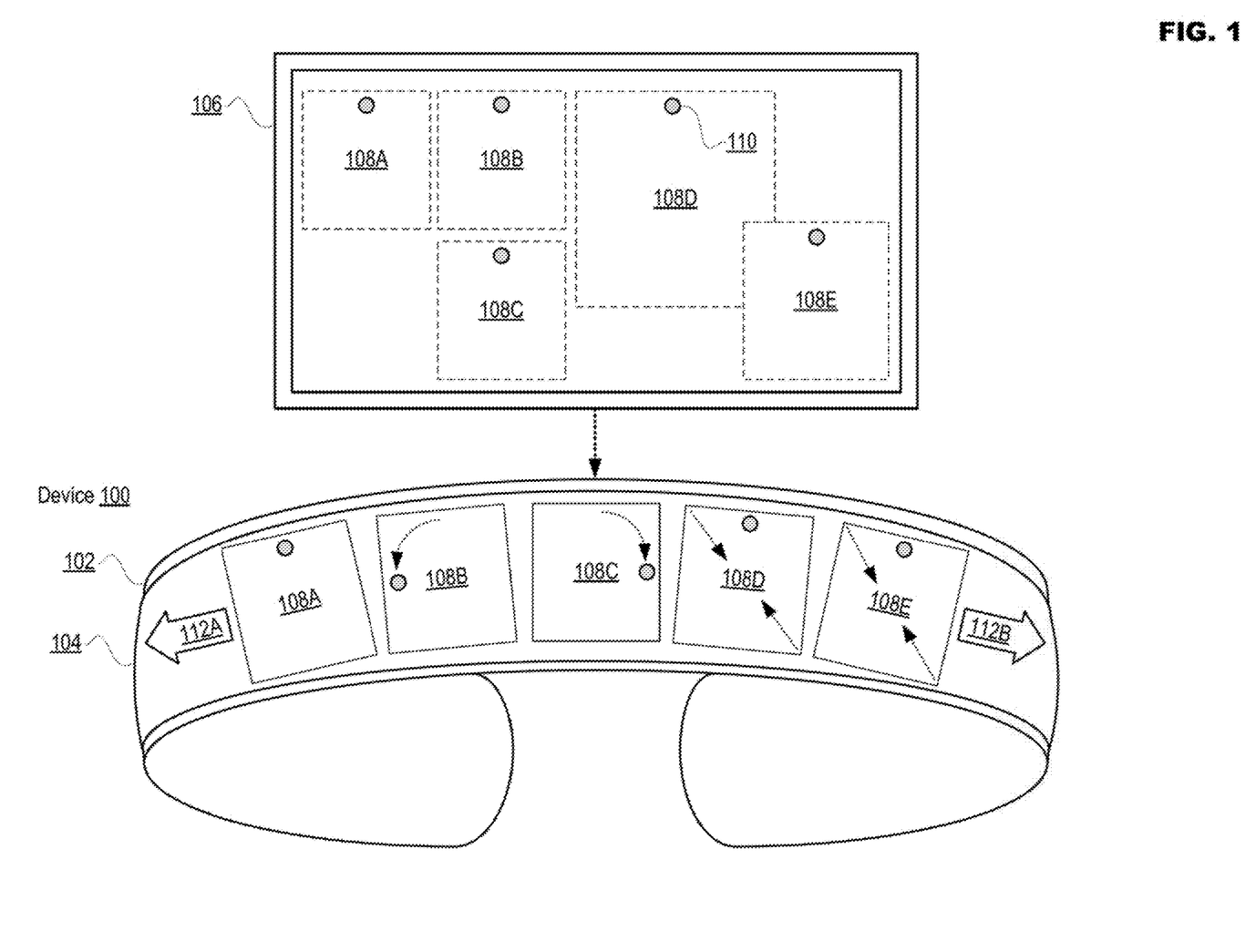
FIG. 1 illustrates an example device configured for content reconfiguration based on characteristic analysis in accordance with at least one embodiment of the present disclosure.

FIG. 1 illustrates an example device configured for content reconfiguration based on characteristic analysis in accordance with at least one embodiment of the present disclosure. Initially, device 100 has been depicted as a wearable computing device (e.g., a bracelet-type device comprising processing, display and/or communication functionality). Though device 100 has been depicted in a particular wearable format, it is not limited only to the illustrated configuration. Device 100 may be any device with an integral display and/or coupled to an external display. Other examples of device 100 may include, but are not limited to, a mobile communication device such as a cellular handset or a smartphone based on the Android® operating system (OS), iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a stationary computing device such as a desktop computer, a set-top device, a smart television (TV), etc.

Device 100 may comprise a central processing unit (CPU) 102 to which is coupled a display 104. In the example shown in FIG. 1. CPU 102 is the portion of device 100 making up a wearable bracelet portion of device 100 comprising a housing that may include various resources such as processing, interface, communication, power supply, etc. in device 100. It is important to note that the configuration of CPU 102 and display 104 may vary depending on, for example, the particular application for which device 100 is being implemented. In accordance with the various embodiments disclosed herein, display 104 may be constructed using any technology existing now or in the future that allows for the formation of a curved surface in the display. For example, display 104 may be based on various technologies such as, but not limited to, cathode ray tube (CRT), plasma, light-emitting diode (LED), Organic LED (OLED), Active-matrix OLED (AMOLED), etc.

During example operation, an event may trigger presentation of content 106 on device 100. Examples of events may include user interaction with device 100 to cause content 106 to be presented, an application causing content 106 to be presented, the receipt of content 106 from another device via wired or wireless communication, etc. Content 106 may comprise at least one image, text, video, etc. for presentation on device 100. Initially, content characteristics may be compared to device characteristics to determine whether modifications are required to present content 106. In the example of FIG. 1, content 106 has characteristics that may make it difficult to present on display 104. For example, the size of content 106 is much larger than display 104 and the dimensions do not correspond to the shape of display 104. Attempting to display content 106 on display 104 without any modification may result in a representation of content 106 that may be unusable for a user of device 100. In particular, reducing the size of content 106 to fit fully within display 104 may render it nearly impossible to perceive details and presenting larger versions of content 106 in its original format may require a substantial amount of scrolling to view the entire presentation. This increased amount of manipulation may prove annoying to a user, which may negatively impact the quality of the experience.

In one embodiment, content 106 may be reconfigured for presentation on display 104. For example, content 106 may be divided into portions 108A, 108B, 108C, 108D and 108E (hereafter portions 108A . . . E). While only five portions 108A . . . E are disclosed in FIG. 1, the number and composition of portions 108 may depend on the size of content 106, the criteria used to divide up content 106, etc. At least one criterion that may be employed for dividing up content 106 is subject matter. For example, content 106 may be a digital photograph that may include a group of people. Portions 108A . . . E may include faces for each of the people in the group. In another example, content 106 may comprise indicia (e.g., signs, posters, etc.) including text and portions 108A . . . E may correspond to each indicia including text. These are merely examples of criterion on which portions 108A . . . E may be based, and in actuality portions 108A . . . E may be determined in content 106 based on various manners of selection.

Figure 4:
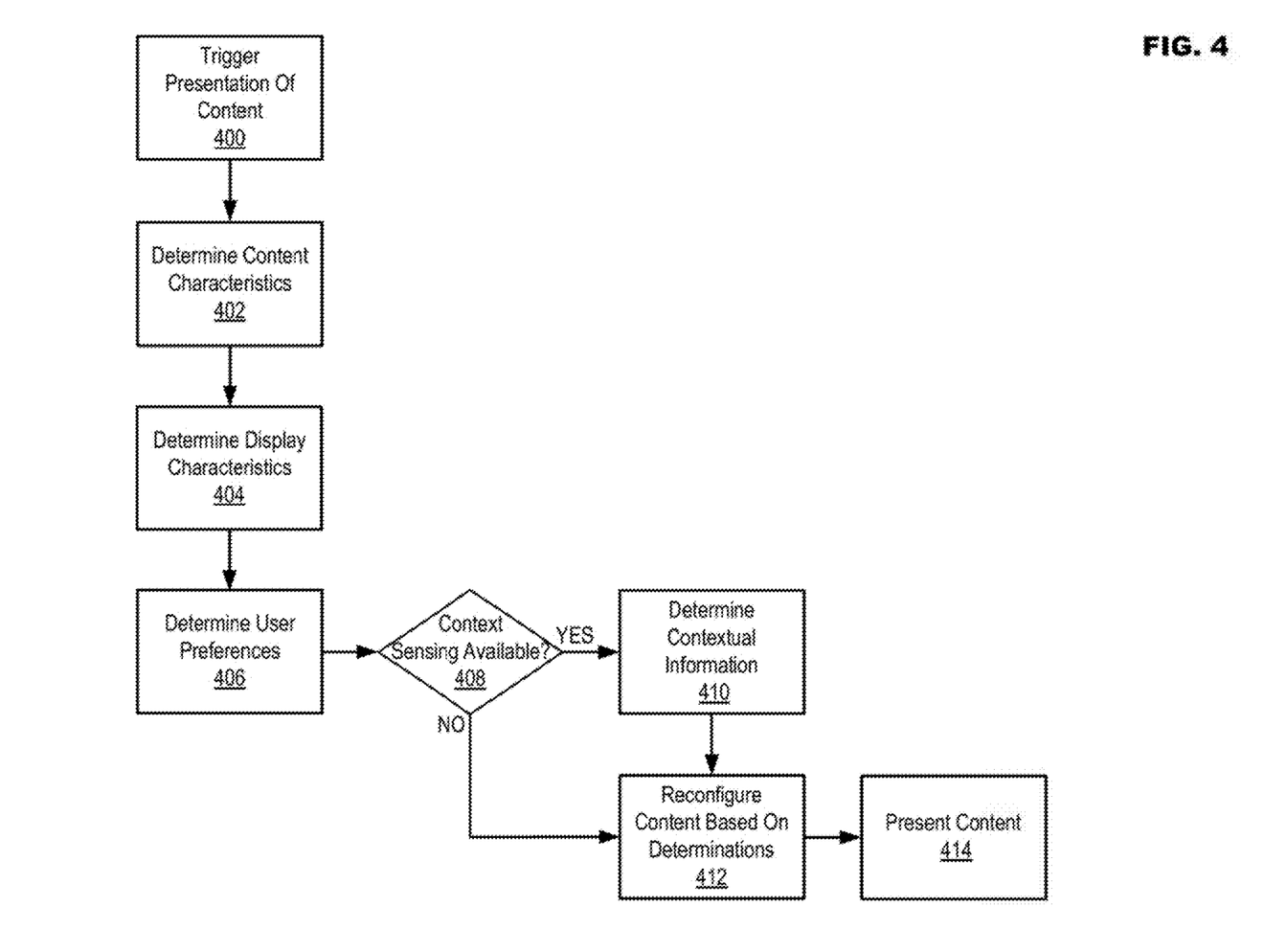
FIG. 4 illustrates example operations for content reconfiguration based on characteristic analysis in accordance with at least one embodiment of the present disclosure.

After portions 108A . . . E are determined at least one of portion 108 may be selected for presentation on display 104. The number of portions 108A . . . E selected for presentation may be based on, for example, the capabilities of device 100 including the size of display 104, the total number of portions 108A . . . E, user configuration, etc. In the example of FIG. 1 all of portions 108A . . . E may be displayed. In one embodiment additional portions 108 may be displayed through the use of user interface controls like 112A and 112B in FIG. 1. User interface controls 112A and 112B may be physical buttons, images presented on display 106 (e.g., given display 106 has touch screen capabilities) to allow for scrolling through portions 108A . . . E, and beyond, using a "forward" and "back" interaction. In one embodiment, prior to being presented on display 104 portions 108A . . . E may be altered for better presentation. For example, orientation marks 110 demonstrate how the orientation of portions 108A . . . E may be modified, while the inward pointing arrows on portions 108D and 108E demonstrate resizing. The at least one portion 108 may then be presented on display 104. In the example of FIG. 4, portions 108A . . . E are all presented on display 104. At least one benefit that may be realized consistent with embodiments of the present disclosure is that while the entirety of content 106 may not be presented on display 104 (at least not in a useful manner), presenting portions 108A . . . E allows aspects of content 106 that may be most important to the user to be presented at a viewable scale without the need for a lot of user manipulation (e.g., scrolling).

In one embodiment, the division of content 106 into portions 108A . . . E and/or the determination of at least one portion 108 for presentation on display 104 may be based on more than just the characteristics of content 106 and display 104. User preferences and/or contextual information may also be employed to determine how to divide and present content 106. For example, a device user may manually configure device 100 to automatically detect and select faces (or other objects) in content 106. User preferences may be any configuration set by a user. User preferences may be conveyed by, for example, menu configuration, user touch interaction with device 100, user voice interaction, sensed user gesture interaction, etc. User preferences may also include learning algorithms to determine the common interests of the device user simply through regular use of device 100, which may employ these learned interests when reconfiguring content 106 for presentation on display 104. In the same or a different embodiment, device 100 may also be capable of determining contextual information for use in preparing content 106 for display. Examples of contextual information may include, but are not limited to, user identification (e.g., if more than one device user is able to access device 100), user activity (e.g., driving, running, walking, sitting, eating, shopping, watching a movie, television, etc.), device location (e.g., based on Global Positioning System (GPS) coordinates, short-range wireless communication signals, etc.), device orientation, time, environmental conditions (e.g., indoors/outdoors, light/dark, weather, temperature, etc.) or identification of other proximate users/devices (e.g., based on wireless signaling), etc. Contextual information may dictate different selection parameters based on the context. For example, determining that device 100 is in a certain location (e.g., home, work, school, social venues, special events, certain shopping establishments, etc.) may dictate different criteria for reconfiguring content 106. A context where device 100 is determined to be at a social venue may cause device 100 to use face detection for content division and selection, whereas being at a special event or certain shopping establishment may cause division/selection to be based on certain indicia (e.g., sports team logos), pieces of clothing and/or accessories detectable in content 106. In another example, determining that other devices are proximate to device 100 may also cause division/selection to be based on face detection, but may also employ facial identification corresponding to the device users of the other devices determined to be within communication range of device 100 (e.g., to detect the faces of the users currently nearby).

Figure 2:
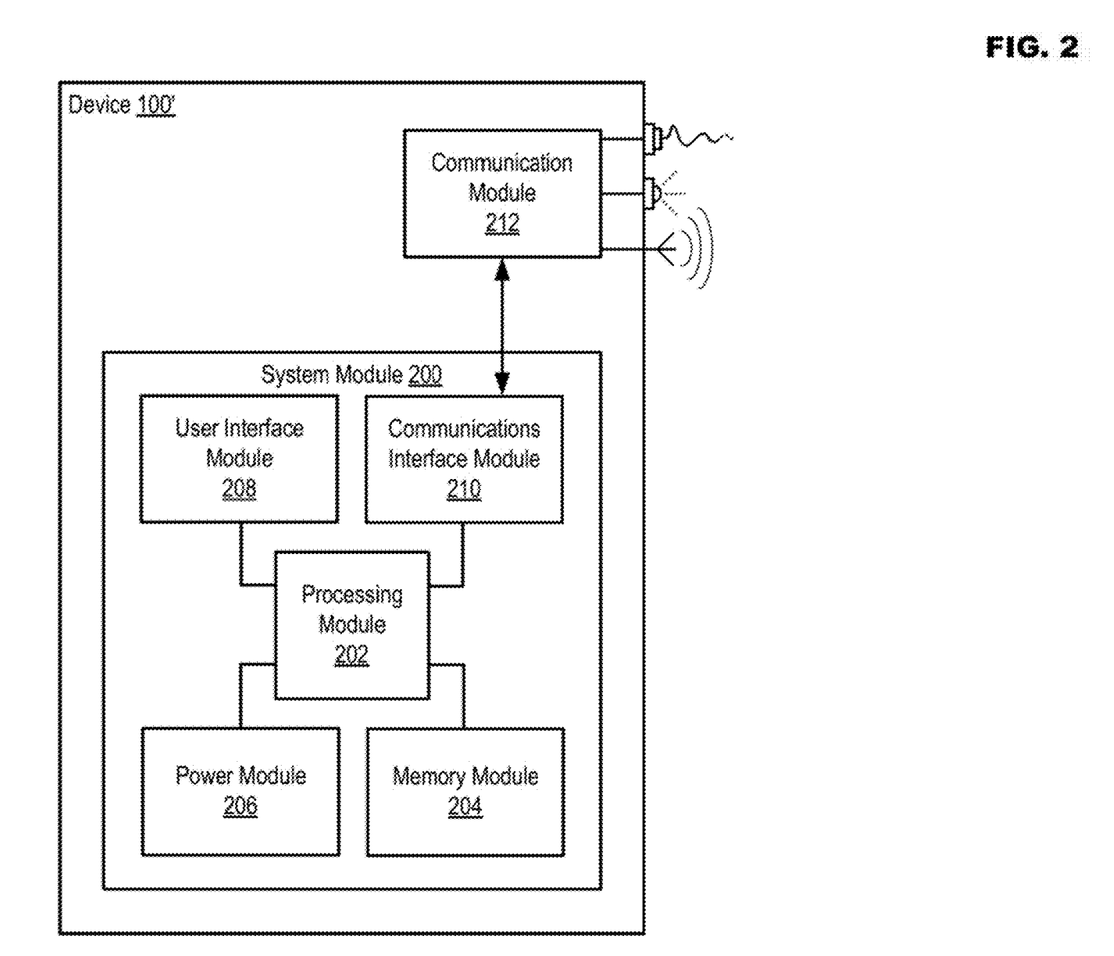
FIG. 2 illustrates an example configuration for a device usable in accordance with at least one embodiment of the present disclosure.

FIG. 2 illustrates an example configuration for a device usable in accordance with at least one embodiment of the present disclosure. In particular, while device 100' may perform example functionality such as disclosed in FIG. 1, device 100' is meant only as an example of equipment usable in accordance with embodiments consistent with the present disclosure, and is not meant to limit these various embodiments to any particular manner of implementation.

Device 100' may comprise system module 200 configured to manage device operations. System module 200 may include, for example, processing module 202, memory module 204, power module 206, user interface module 208 and communication interface module 210 that may be configured to interact with communication module 212. While communication module 212 is shown separately from system module 200, this arrangement is merely for the sake of explanation herein. Some or all of the functionality associated with communication module 212 may also be incorporated within system module 200.

In device 100', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as a microprocessor (e.g., in an SoC package like the Sandy Bridge integrated circuit available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory configured to hold information during the operation of device 100' such as, for example, static RAM (SRAM) or Dynamic RAM (DRAM). ROM may include memories such as bios memory configured to provide instructions when device 100' activates in the form of bios, Unified Extensible Firmware Interface (UEFI), etc., programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 100' with the power needed to operate.

User interface module 208 may include circuitry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, wireless local area networking (WLAN), Wi-Fi, etc.) and long range wireless mediums (e.g., cellular wide area radio communication technology, satellite technology, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, user interface module 208 may interact with display 104, such as disclosed in FIG. 1, to present content 106. In support of this activity, user interface module 208 may comprise, for example, equipment (e.g., video processors, chipsets, cards, etc.) and/or software (e.g., video compressors/decompressors (codecs), drivers, physics engines, etc.) usable for causing content 106 to be presented on display 104. Content 106 may be retrieved from memory module 104 or may be "streamed" (e.g., may be received continuously from a source outside of device 100') through communication module 212 utilizing wired and/or wireless communication. User interface module may also interact with at least communication module 212 to, for example, determine contextual information.

Figure 3:
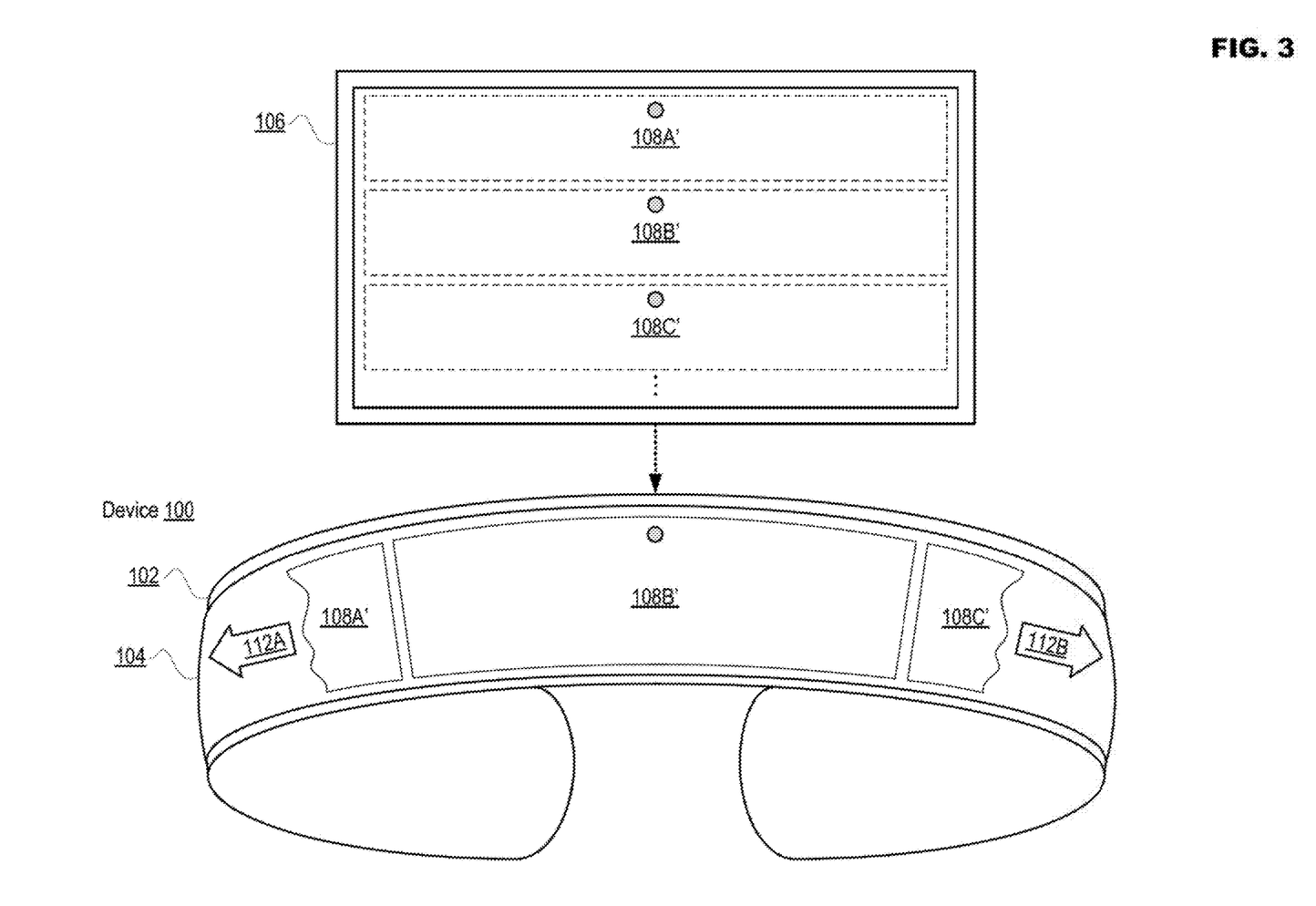
FIG. 3 illustrates an alternative example of content reconfiguration based on characteristic analysis in accordance with at least one embodiment of the present disclosure.

FIG. 3 illustrates an alternative example of content reconfiguration based on characteristic analysis in accordance with at least one embodiment of the present disclosure. In one embodiment content 106 may be divided into portions 108A' . . . C' (and additional portions 108, if necessary) based at least on the characteristics of display 104. In FIG. 3, display 104 includes an elongated "strip" shape and portions 108A' . . . C' may conform to this shape. Portions 108A' . . . C' may further be altered for presentation (e.g., resized, reoriented, etc.). In an example of operation, one portion 108A' . . . C' may be fully visible on display 106 at a time, with user interface controls 112A and 112B allowing the user to scroll back and forth from portion 108A' to portion 108C'. While in the example of FIG. 3 portions 108A' . . . C' have been shown as horizontal strips, vertically-formed strips may also be formed based on, for example, user preferences, contextual information (e.g., at least one sensor providing information on the orientation of device 100), etc. The configuration of portions 108A' . . . C' may employ a shape, orientation, resolution, etc. that provides a presentation of content 106 most readily comprehensible, navigable, etc. to a user based on the capabilities of device 100.

FIG. 4 illustrates example operations for content reconfiguration based on characteristic analysis in accordance with at least one embodiment of the present disclosure. In operation 400 an event may trigger presentation of content on a device. Example events for causing the presentation of content on the device of may include, but are not limited to, user interaction with the device, an application in the device, etc., the receipt of content from other devices via wired or wireless communication, etc. Characteristics for the content may then be determined in operation 402. Example content characteristics may include, but are not limited to, of content size, shape, orientation, resolution, color composition, subject matter, etc. Characteristics for a display in the device may then be determined in operation 404. Example display characteristics may include, but are not limited to, display size, resolution, refresh rate, surface shape, etc. In operation 406 user preferences may then be determined. Example user preferences may include, but are not limited to, user device configurations, previous user behavior (e.g., as sensed by a learning algorithm active in the device), etc.

In operation 408 a determination may be made as to whether context sensing is available in the device. The availability of context sensing in the device may be based on, for example, at least one sensor being installed, active and accessible in the device, processing load in the device, communication traffic in the device, etc. If it is determined in operation 408 that context sensing is available, then in operation 410 contextual information may be determined for the device. Examples of contextual information include, but are not limited to, device user identification, location, orientation, time or identification of other proximate devices. Following a determination in operation 408 that context sensing is not available, or alternatively following operation 410, in operation 412 the content may be reconfigured based on any or all of the determination performed on operations 400-410. Reconfiguration of the content may include determining at least one portion of the content for presentation on the device. Reconfiguration of the content may further comprise altering at least one of size, shape, orientation, resolution or color composition of the at least one portion of content. In operation 414 the reconfigured content (e.g., the at least one portion) may then be presented on the device.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, this disclosure is directed to content reconfiguration based on characteristic analysis. A device may comprise a display and a user interface module to cause content to be presented on the display. When content is to be presented, content and display characteristics may first be determined. The content may then be altered based on the characteristics of the display. For example, the content may be divided into portions and at least one portion of the content may be determined for presentation based on subject matter in the content selected in view of at least one of user preferences, contextual information determined by at least one sensor in the device, etc. The user interface module may then alter the at least one portion of content for presentation, if necessary, and may further cause the at least one portion of content to be presented on the display.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to account for content reconfiguration based on characteristic analysis, as provided below.

Example 1

According to this example there is provided a device. The device may include a display to present at least content and a user interface module to determine characteristics for the content, determine characteristics for the display, reconfigure the content for presentation on the display based at least on the content characteristics and the display characteristics and cause the reconfigured content to be presented on the display.

Example 2

This example includes the elements of example 1, wherein the content characteristics comprise at least one of content size, shape, orientation, resolution, color composition and subject matter.

Example 3

This example includes the elements of any of examples 1 to 2, wherein the display characteristics comprise at least one of display size, resolution, refresh rate and surface shape.

Example 4

This example includes the elements of any of examples 1 to 3, wherein the user interface module being to reconfigure the content comprises the user interface module being to determine at least one portion of the content for presentation on the display based on the subject matter determined for the content.

Example 5

This example includes the elements example 4, wherein the user interface module being to reconfigure the content comprises the user interface module being to alter at least one of size, shape, orientation, resolution or color composition of the at least one portion of content.

Example 6

This example includes the elements of example 5, wherein the user interface module being to cause the reconfigured content to be presented comprises the user interface module being to cause the at least one portion of content to be presented on the display.

Example 7

This example includes the elements of any of examples 4 to 6, wherein the user interface module is further to cause the device to determine contextual information.

Example 8

This example includes the elements of example 7, wherein contextual information comprises at least one of user identification, user activity, device location, device orientation, time, environmental conditions or identification of other proximate devices.

Example 9

This example includes the elements of any of examples 7 to 8, wherein the user interface module being to reconfigure the content for presentation comprises the user interface module being to select subject matter for determining the at least one portion of content based on the contextual information.

Example 10

This example includes the elements of any of examples 1 to 9, wherein the user interface module is further to determine user preferences for use in reconfiguring the content for presentation on the display.

Example 11

This example includes the elements of example 10, wherein the user preferences are based on previous user actions.

Example 12

This example includes the elements of any of examples 1 to 11, wherein the user interface module is further to cause at least one user interface control to be presented on the display along with the content, the user interface control being to allow the user to manipulate the presentation of the content on the display.

Example 13

This example includes the elements of any of examples 1 to 12, wherein the user interface module is further to determine at least one of display orientation or device orientation and to reconfigure the content for presentation on the display based further on the at least one of display or device orientation.

Example 14

This example includes the elements of any of examples 1 to 13, wherein the device is wearable on a human body.

Example 15

This example includes the elements of example 14, where the device is at least one of a bracelet or eyewear.

Example 16

This example includes the elements of any of examples 1 to 15, wherein the content characteristics comprise at least one of content size, shape, orientation, resolution, color composition and subject matter and the display characteristics comprise at least one of display size, resolution, refresh rate and surface shape.

Example 17

This example includes the elements of any of examples 1 to 16, wherein the user interface module being to reconfigure the content comprises the user interface module being to determine at least one portion of the content for presentation on the display based on the subject matter determined for the content, alter at least one of size, shape, orientation, resolution or color composition of the at least one portion of content and cause the at least one portion of content to be presented on the display.

Example 18

This example includes the elements of example 17, wherein the user interface module is further to cause the device to determine contextual information comprising at least one of user identification, user activity, device location, device orientation, time, environmental conditions or identification of other proximate devices and select subject matter for determining the at least one portion of content based on the contextual information.

Example 19

According to this example there is provided a method. The method may include triggering a requirement to present content on a display in a device, determining characteristics for the content, determining characteristics for the display, reconfiguring the content for presentation on the display based at least on the content characteristics and the display characteristics and causing the reconfigured content to be presented on the display.

Example 20

This example includes the elements of example 19, wherein the content characteristics comprise at least one of content size, shape, orientation, resolution, color composition and subject matter.

Example 21

This example includes the elements of any of examples 19 to 20, wherein the display characteristics comprise at least one of display size, resolution, refresh rate and surface shape.

Example 22

This example includes the elements of any of examples 19 to 21, wherein reconfiguring the content comprises determining at least one portion of the content for presentation on the display based on the subject matter determined for the content.

Example 23

This example includes the elements of example 22, wherein reconfiguring the content comprises altering at least one of size, shape, orientation, resolution or color composition of the at least one portion of content.

Example 24

This example includes the elements of example 23, wherein causing the reconfigured content to be presented comprises causing the at least one portion of content to be presented on the display.

Example 25

This example includes the elements of any of examples 22 to 24, and further comprises causing the device to determine contextual information.

Example 26

This example includes the elements of example 25, wherein contextual information comprises at least one of user identification, user activity, device location, device orientation, time, environmental conditions or identification of other proximate devices.

Example 27

This example includes the elements of example 26, wherein reconfiguring the content for presentation comprises selecting subject matter for determining the at least one portion of content based on the contextual information.

Example 28

This example includes the elements of any of examples 19 to 27, and further comprises determining user preferences for use in reconfiguring the content for presentation on the display.

Example 29

This example includes the elements of example 28, wherein the user preferences are based on previous user actions.

Example 30

This example includes the elements of any of examples 19 to 29, and further comprises causing at least one user interface control to be presented on the display along with the content, the user interface control being to allow the user to manipulate the presentation of the content on the display.

Example 31

This example includes the elements of any of examples 19 to 30, and further comprises determining at least one of display orientation or device orientation and to reconfigure the content for presentation on the display based further on the at least one of display or device orientation.

Example 32

This example includes the elements of any of examples 19 to 31, wherein the content characteristics comprise at least one of content size, shape, orientation, resolution, color composition and subject matter and the display characteristics comprise at least one of display size, resolution, refresh rate and surface shape.

Example 33

This example includes the elements of any of examples 19 to 32, wherein reconfiguring the content comprises determining at least one portion of the content for presentation on the display based on the subject matter determined for the content and altering at least one of size, shape, orientation, resolution or color composition of the at least one portion of content.

Example 34

This example includes the elements of example 33, wherein causing the reconfigured content to be presented comprises causing the at least one portion of content to be presented on the display.

Example 35

This example includes the elements of any of examples 33 to 34, and further comprises causing the device to determine contextual information comprising at least one of user identification, user activity, device location, device orientation, time, environmental conditions or identification of other proximate devices and determining the at least one portion of content based on the contextual information.

Example 36

According to this example there is provided a system including at least a device, the system being arranged to perform the method of any of the prior examples 19 to 35.

Example 37

According to this example there is provided a chipset arranged to perform the method of any of the prior examples 19 to 35.

Example 38

According to this example there is provided at least one machine readable medium comprising a plurality of instructions that, in response to be being executed on a computing device, cause the computing device to carry out the method according to any of the prior examples 19 to 35.

Example 39

According to this example there is provided a device configured for content reconfiguration based on characteristic analysis, the device being arranged to perform the method of any of the prior examples 19 to 35.

Example 40

According to this example there is provided a device having means to perform the method of any of the prior examples 19 to 35.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device, comprising:
a local memory module;
a display to present at least one image or video, wherein the display has one or more display surface shape characteristics and is touch sensitive to receive user inputs; and
user interface circuitry to:
detect an object in the at least one image or video, at least partially based on the subject matter of the at least one image or video and/or at least partially based on device contextual information;
spatially divide the at least one image or video into a plurality of portions based at least in part on the detected object, wherein a first of the plurality of portions includes the detected object and a second of the plurality of portions excludes the detected object;
reconfigure the first and second of the plurality of portions of the at least one image or video for presentation in a scrollable format on the display based on the one or more display surface shape characteristics and the device contextual information;
display the first of the plurality of portions that includes the detected object in the display separately from the second of the plurality of portions that excludes the detected object;
without otherwise displaying the at least one image or video on the display, cause the reconfigured first and second of the plurality of portions of the at least one image or video to be presented on the display in the scrollable format with the portion of the at least one image or video including the detected object being displayed in a selected position; and
cause user interface controls to be presented on the display to allow scrolling through the portions of the at least one image or video via user touch interaction.

2. The device of claim 1, wherein to reconfigure the first and second of the plurality of portions of the at least one image or video is further based on display characteristics that include at least one of display size, resolution and refresh rate.

3. The device of claim 1, wherein the user interface circuitry is further to:

alter at least one of size, shape, orientation, resolution or color composition of the first of the plurality of portions of the at least one image or video having the object.

4. The device of claim 1, wherein the device contextual information comprises at least one of device user identity, device user activity, device location, device orientation, time, environmental conditions or identification of other proximate devices.

5. The device of claim 4, wherein the user interface circuitry further reconfigures the at least one portion of the at least one image or video having the object based on, at least in part, the device contextual information.

6. The device of claim 1, wherein the detected object is a face.

7. A method, comprising:
acquiring, during at least one previous user interaction with a device, data representative of at least one learned user interest;
acquiring, via one or more sensors coupled to the device, data representative of device contextual information;
locally storing the acquired data representative of the at least one learned user interest and the data representative of the device contextual information in a memory module disposed in the device;
detecting an object in at least one image or video, at least partially based on the subject matter of the at least one image or video and/or at least partially based on the device contextual information;
spatially dividing the at least one image or video into a plurality of portions based at least in part on the detected object, wherein a first of the plurality of portions including the detected object and a second of the plurality of portions excludes the detected object;
reconfiguring the first of the plurality of portions of the at least one image or video for presentation in a scrollable format on a display that is touch sensitive to receive user inputs, the reconfiguring of the first of the plurality of portions being based on surface shape characteristics of the display and the device contextual information;
displaying the first of the plurality of portions that includes the detected object in the display separately from the second of the plurality of portions that excludes the detected object;
without otherwise displaying the at least one image or video on the display, causing the reconfigured first of the plurality of portions of the at least one image or video to be presented on the display in the scrollable format with the portion of the at least one image or video including the detected object being displayed in a selected position; and
causing user interface controls to be presented on the display to allow scrolling through the portions of the at least one image or video via user touch interaction.

8. The method of claim 7, wherein the reconfiguring of the first of the plurality of portions of the at least one image or video is further based on display characteristics that include at least one of display size, resolution and refresh rate.

9. The method of claim 7, wherein reconfiguring the first of the plurality of portions of the at least one image or video having the object comprises:
altering at least one of size, shape, orientation, resolution or color composition of the first of the plurality of portions of the at least one image or video having the object.

10. The method of claim 7 wherein the device contextual information comprises at least one of device user identity, device user activity, device location, device orientation, time, environmental conditions or identification of other proximate devices.

11. The method of claim 10, wherein reconfiguring the first of the plurality of portions of the image or video having the object is further based on, at least in part, the device contextual information.

12. The method of claim 7, wherein the detected object is a face.

13. At least one non-transitory machine-readable storage device having stored thereon, individually or in combination, instructions that when executed by one or more processors disposed in a device result in the following operations comprising:
acquire, during at least one previous user interaction with the device, data representative of at least one learned user interest;
acquire, via one or more sensors coupled to the device, data representative of device contextual information;
locally store the acquired data representative of the at least one learned user interest and the data representative of the device contextual information in a memory module disposed in the device;
detect an object in at least one image or video, at least partially based on the subject matter of the at least one image or video and/or at least partially based on device contextual information;
spatially divide the at least one image or video into a plurality of portions based at least in part on the detected object, wherein the first of the plurality of portions includes the detected object and a second of the plurality of portions excludes the detected object;
reconfigure the first of the plurality of portions of the at least one image or video for presentation in a scrollable format on a display that is touch sensitive to receive user inputs, wherein to reconfigure the first of the portions is based on surface shape characteristics of the display and the device contextual information;
display the first of the plurality of portions that includes the detected object in the display separately from the second of the plurality of portions that excludes the detected object;
without otherwise displaying the at least one image or video on the display, cause the reconfigured first of the plurality of portions of the at least one image or video to be presented on the display in the scrollable format with the portion of the at least one image or video including the detected object being displayed in a selected position; and
cause user interface controls to be presented on the display to allow scrolling through the portions of the at least one image or video via user touch interaction.

14. The at least one non-transitory machine-readable storage device of claim 13, wherein to reconfigure the first of the plurality of portions is further based on display characteristics that include at least one of display size, resolution and refresh rate.

15. The at least one non-transitory machine-readable storage device of claim 13, further comprising instructions that when executed by one or more processors result in the following operations comprising:
alter at least one of size, shape, orientation, resolution or color composition of the first of the plurality of portions of the at least one image or video.

16. The at least one non-transitory machine-readable storage device of claim 13, further comprising instructions that when executed by one or more processors result in the following operations comprising:

acquire device contextual information comprising at least one of user identification, user activity, device location, device orientation, time, environmental conditions or identification of other proximate devices.

17. The at least one non-transitory machine-readable storage device of claim 16, wherein the reconfiguring of the first of the plurality of portions of the image or video is further based at least in part on the device contextual information.

18. The at least one non-transitory machine readable storage device of claim 13, wherein the detected object is a face.

* * * * *